United States Patent
Reber

(10) Patent No.: US 11,851,167 B2
(45) Date of Patent: Dec. 26, 2023

(54) INTEGRAL STEERING MOTOR AND COLLAR FOR LANDING GEAR

(71) Applicant: GOODRICH CORPORATION, Charlotte, NC (US)

(72) Inventor: Korey Michael Reber, Strongsville, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 5 days.

(21) Appl. No.: 17/679,598

(22) Filed: Feb. 24, 2022

(65) Prior Publication Data

US 2023/0264810 A1 Aug. 24, 2023

(51) Int. Cl.
*B64C 25/50* (2006.01)

(52) U.S. Cl.
CPC ............ *B64C 25/50* (2013.01); *B64C 25/505* (2013.01)

(58) Field of Classification Search
CPC ... B64C 25/50; B64C 25/505; F16D 2125/26; F16H 21/22; F16H 25/14; F16H 37/124
See application file for complete search history.

(56) References Cited

U.S. PATENT DOCUMENTS

| | | | | |
|---|---|---|---|---|
| 2,492,649 A | * | 12/1949 | MacDuff | B64C 25/50 244/50 |
| 2,775,899 A | * | 1/1957 | Vagneur | F16H 21/22 74/44 |
| 2,919,084 A | * | 12/1959 | Lovell | B64C 25/50 244/50 |
| 2,988,056 A | * | 6/1961 | Rumsey | B64C 25/505 91/363 R |
| 3,124,043 A | * | 3/1964 | Kendall et al. | F15B 11/20 244/50 |
| 3,211,400 A | * | 10/1965 | Booth | B64C 25/50 244/50 |
| 3,226,061 A | * | 12/1965 | Dowty | B64C 25/50 244/50 |
| 3,430,896 A | | 3/1969 | Labrecque | |
| 4,172,571 A | * | 10/1979 | Bowdy | B64C 25/50 244/50 |
| 4,313,364 A | * | 2/1982 | Blincoe | F15B 15/06 91/361 |
| 5,002,143 A | * | 3/1991 | Bernard | B64C 25/505 244/50 |
| 8,177,160 B2 | | 5/2012 | Hadley et al. | |
| 8,353,382 B2 | | 1/2013 | Janz et al. | |

(Continued)

OTHER PUBLICATIONS

European Patent Office, European Search Report dated Jun. 22, 2023 in Application No. 23157808.9.

(Continued)

*Primary Examiner* — Christopher D Hutchens
(74) *Attorney, Agent, or Firm* — SNELL & WILMER L.L.P.

(57) ABSTRACT

A steering apparatus may comprise a steering collar, a first linear actuator, a first drive gear, a crankshaft, and a sun gear, wherein the sun gear is disposed within the collar, wherein the first drive gear is fixed to the crankshaft and coupled to the sun gear such that the collar rotates about the sun gear in response to rotation of the crankshaft, wherein the first linear actuator is coupled between the crankshaft and the collar.

17 Claims, 14 Drawing Sheets

(56) References Cited

U.S. PATENT DOCUMENTS

| | | | |
|---|---|---|---|
| 8,944,368 B2* | 2/2015 | Elliot | B64C 25/50 |
| | | | 244/50 |
| 10,562,615 B2 | 2/2020 | Wilson et al. | |
| 11,066,154 B2 | 7/2021 | Morris | |
| 11,072,420 B1 | 7/2021 | Acks et al. | |
| 2007/0241230 A1* | 10/2007 | Bucheton | B64C 25/50 |
| | | | 244/104 R |
| 2008/0272234 A1 | 11/2008 | Thulbon | |
| 2009/0090810 A1* | 4/2009 | De Ruffray | B64C 25/50 |
| | | | 244/50 |
| 2017/0343091 A1* | 11/2017 | Zivkovich | F16H 37/124 |
| 2021/0131540 A1* | 5/2021 | MacDonald | F02G 1/02 |

OTHER PUBLICATIONS

European Patent Office, European Search Report dated Jun. 22, 2023 in Application No. 23171336.3.

* cited by examiner

INTEGRAL STEERING MOTOR AND COLLAR FOR LANDING GEAR

FIELD

The present disclosure generally relates to systems and methods for landing gear and, more specifically, to aircraft nosewheel steering.

BACKGROUND

Traditional methods of nosewheel steering tend to be relatively complex and may be unreliable due to such complexity.

SUMMARY

In various embodiments, systems, methods, and articles of manufacture (collectively, the "system") for nosewheel steering are disclosed. A steering apparatus may comprise a steering collar, a first linear actuator, a first drive gear, a crankshaft, and a sun gear, wherein the sun gear is disposed within the steering collar, wherein the first drive gear is fixed to the crankshaft and coupled to the sun gear such that the steering collar rotates about the sun gear in response to rotation of the crankshaft, wherein the first linear actuator is coupled between the crankshaft and the steering collar.

In various embodiments, the apparatus may comprise a second drive gear. In various embodiments, a sidewall of the steering collar comprises a portal. In various embodiments, a second linear actuator may be coupled between the crankshaft and the steering collar. In various embodiments, the second linear actuator may be arranged with the first linear actuator in a V configuration. In various embodiments, the second linear actuator may be arranged with the first linear actuator in an in-line configuration.

A steering system for an aircraft may comprise a strut cylinder, a strut piston, and a steering apparatus comprising a steering collar coupled to the strut cylinder, a first linear actuator, a first drive gear, a crankshaft, and a sun gear fixed to the strut cylinder, wherein the sun gear is disposed within the steering collar, wherein the first drive gear is fixed to the crankshaft and coupled to the sun gear such that the steering collar rotates about the sun gear in response to rotation of the crankshaft, wherein the first linear actuator is coupled between the crankshaft and the steering collar.

In various embodiments, the system comprises a second drive gear. In various embodiments, a sidewall of the steering collar comprises a portal. In various embodiments, the system comprises a second linear actuator coupled between the crankshaft and the steering collar. In various embodiments, the second linear actuator is arranged with the first linear actuator in a V configuration. In various embodiments, the second linear actuator is arranged with the first linear actuator in an in-line configuration. In various embodiments, the steering collar further comprises a retention feature opposite an upper surface of the steering collar and configured to retain the sun gear within the steering collar. In various embodiments, the steering collar includes a reinforced portion at the upper surface, wherein the reinforced portion abuts a shoulder of the strut cylinder generating a contact therebetween which inhibits the steering collar from translating axially upward along the strut cylinder.

In various embodiments, an aircraft comprises a plurality of landing gear and a steering system coupled to at least one of the plurality of landing gear, the steering system comprising a strut cylinder, a strut piston, and a steering apparatus comprising a steering collar coupled to the strut cylinder, a torque link coupled to the steering collar, a first linear actuator, a first drive gear, a crankshaft, and a sun gear fixed to the strut cylinder, wherein the sun gear is disposed within the steering collar, wherein the first drive gear is fixed to the crankshaft and coupled to the sun gear such that the steering collar rotates about the sun gear in response to rotation of the crankshaft, wherein the first linear actuator is coupled between the crankshaft and the steering collar.

In various embodiments, the system further comprises a second drive gear. In various embodiments, a sidewall of the steering collar comprises a portal. In various embodiments, a second linear actuator may be coupled between the crankshaft and the steering collar. In various embodiments, the second linear actuator may be arranged with the first linear actuator in a V configuration. In various embodiments, the second linear actuator may be arranged with the first linear actuator in an in-line configuration The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
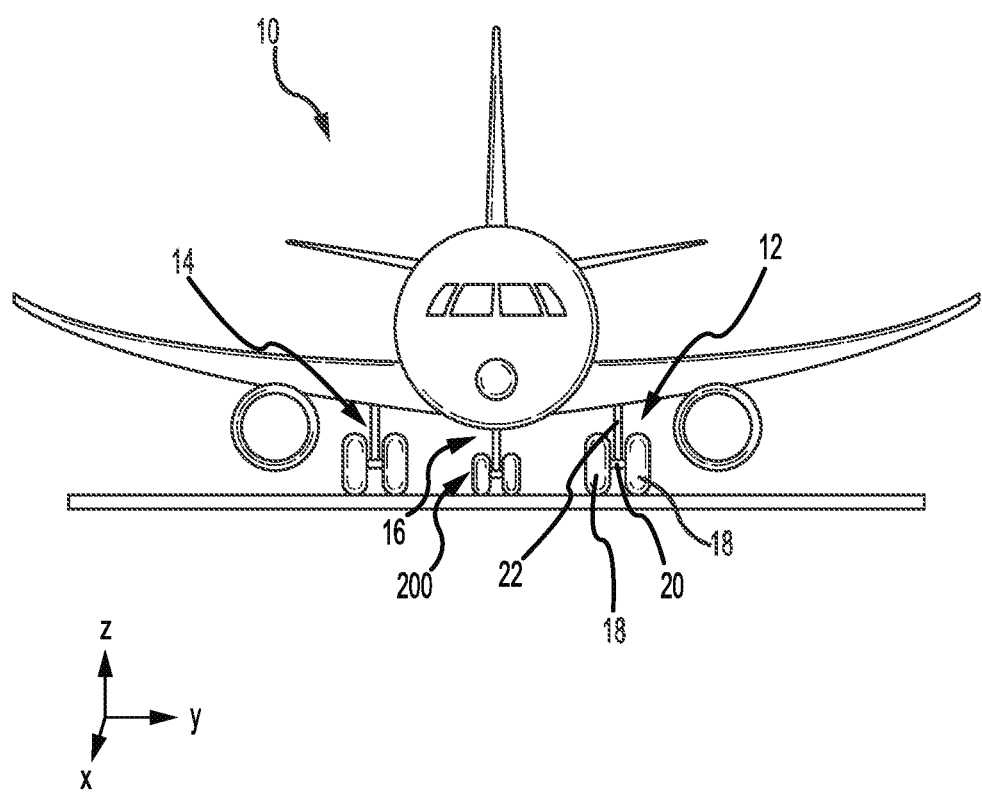
FIG. 1 is an exemplary aircraft, in accordance with various embodiments.

In various embodiments, and with reference to FIG. 1, an aircraft 10 in accordance with various embodiments may comprise aircraft systems, for example, one or more landing gear such as landing gear 12, landing gear 14 and landing gear 16. Landing gear 12, landing gear 14 and landing gear 16 may generally support aircraft 10 when aircraft 10 is not flying, allowing aircraft 10 to taxi, take off, and land without damage and may comprise wheels and an oleo strut, also referred to as a shock strut, comprising a strut cylinder and a strut piston filled with a hydraulic fluid. For example, landing gear 12 may include wheels 18 coupled by an axle 20 and a shock strut assembly 22. In various embodiments, one or more landing gear such as, for example, the landing gear 16 may comprise a steering system 200 configured to enable the axle to pivot about the axis of the shock strut assembly. In this regard, the steering system 200 may tend to enhance the maneuverability of the aircraft 10 when operating on the ground.

Figure 2:
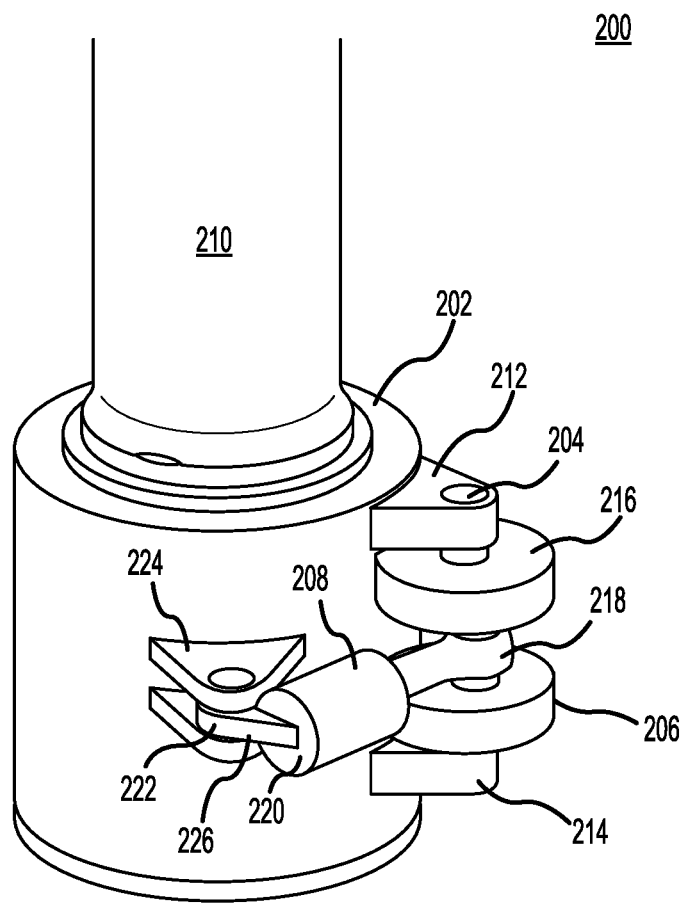
FIG. 2 illustrates a steering system, in accordance with various embodiments.

In various embodiments, and with reference to FIG. 2, steering system 200 is illustrated in accordance with various embodiments. The steering system 200 may be mounted on a forward most landing gear of aircraft 10 (i.e., proximate the nose and thus referred to as nosewheel), in this regard, tend to enable the aircraft 10 to turn. The steering system 200 includes a steering collar 202 (i.e., collar), a crankshaft 204, a first drive gear 206, and an linear actuator 208. The steering collar 202 is mounted to a strut cylinder 210 of the landing gear 16. In various embodiments, a first bearing mount 212 and a second bearing mount 214 extend orthogonally from the outermost diameter of the steering collar 202. The crankshaft 204 may be coupled between the bearing mounts (212, 214) and parallel to the axis of the strut cylinder 210. In this regard, the crankshaft 204 may be free to rotate. The first drive gear 206 may be fixed to the crankshaft 204. In various embodiments, a second drive gear 216 may be fixed to the crankshaft 204.

In various embodiments, the linear actuator 208 is coupled between the crankshaft 204 and the steering collar 202. In this regard, the linear actuator 208 may be configured to drive the rotation of the drive gears (206, 216) via the crankshaft 204. For example, a first end 218 of the linear actuator 208 may be coupled to a crank pin 228 (shown in FIG. 3) of the crankshaft 204. A second end 220 of the linear actuator 208 may include a trunnion 222. The trunnion 222 may be coupled to a trunnion block 224 of the steering collar 202. In various embodiments, the trunnion 222 may be coupled to the linear actuator 208 via a trunnion arm 226.

The trunnion arm 226 may tend to provide improved clearance between the steering collar 202 and align the first end 218 with the crank pin.

Figure 3:
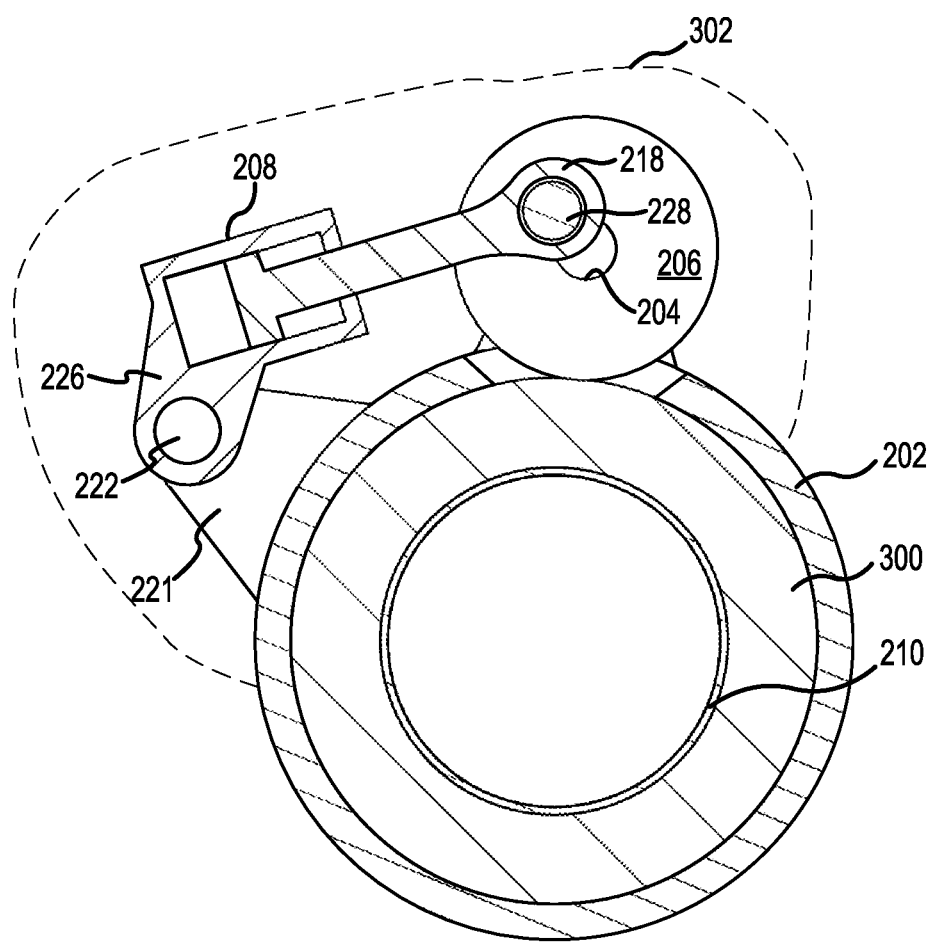
FIG. 3 illustrates a cross-section of a steering system, in accordance with various embodiments.

In various embodiments and with additional reference to FIG. 3, steering system 200 is shown in cross section to a plane orthogonal to the strut cylinder 210. Linear actuator 208 is illustrated as a piston-type linear actuator but it will be appreciated that any type (e.g., hydraulic, pneumatic, electrical, etc.) of linear actuator may be employed. In response to a command signal, the linear actuator 208 may cause rotation of the crankshaft 204 and thereby the drive gears (206, 216). Each of the drive gears (206, 216) may be configured to mesh with a corresponding sun gear 300 fixed to strut cylinder 210. Thereby, the collar 202 may be driven to rotate about the axis of the strut cylinder 210. In various embodiments, the sun gear 300 may be fixed to the strut cylinder 210 by splines or dowels. In various embodiments, the sun gear 300 may be monolithic with the strut cylinder 210. For example, the sun gear 300 may be a machined feature of the strut cylinder 210. In various embodiments, the linear actuator 208 and the drive gears (206, 216) may be enclosed by a housing 302 or other covering. In this regard, the components of the steering system 200 may be protected from harsh environments.

Figure 4:
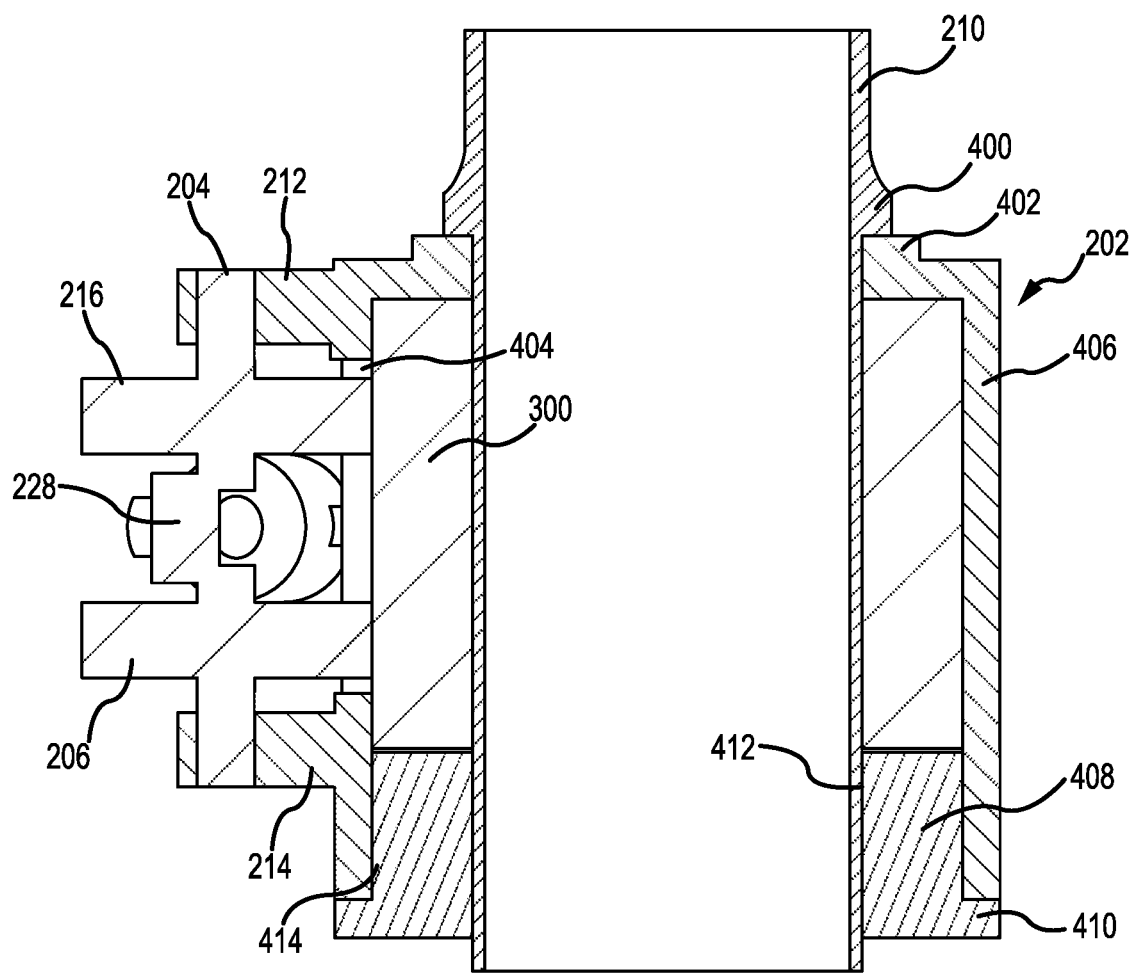
FIG. 4 illustrates a cross-section of a steering system, in accordance with various embodiments.

In various embodiments and with additional reference to FIG. 4, steering system 200 is shown in axial cross section in a plane through the axis of the strut cylinder 210. Collar 202 is coupled about the strut cylinder 210 and encloses the sun gear 300. In various embodiments, the drive gears (206, 216) couple to the sun gear 300 via a portal 404 through the sidewall 406 of the collar 202. In various embodiments the collar 202 is retained from sliding axially upward along the strut cylinder 210 by a shoulder 400 which protrudes radially from the strut cylinder 210. In various embodiments, the collar 202 includes a reinforced portion 402 which extends from the upper surface of the collar 202 and abuts the shoulder 400. In various embodiments, the collar 202 includes a retention feature 408. The retention feature may be located opposite the upper surface of the collar 202 and configured to retain the sun gear 300 within the collar 202. In various embodiments, the retention feature 408 may couple the collar 202 to the strut cylinder 210. For example, the retention feature 408 may include a flange 410 and thereby tend to inhibit the collar from sliding axially downward along the strut cylinder 210. In various embodiments, the retention feature 408 may be a nut or a segmented nut and may comprise inner threading 412 with the strut cylinder 210 and/or outer threading 414 with the collar 202. In various embodiments, the nut may be coupled to the strut cylinder 210 to retain the sun gear 300 and provide a bearing surface for the collar 202 via the flange 410.

Figure 5:
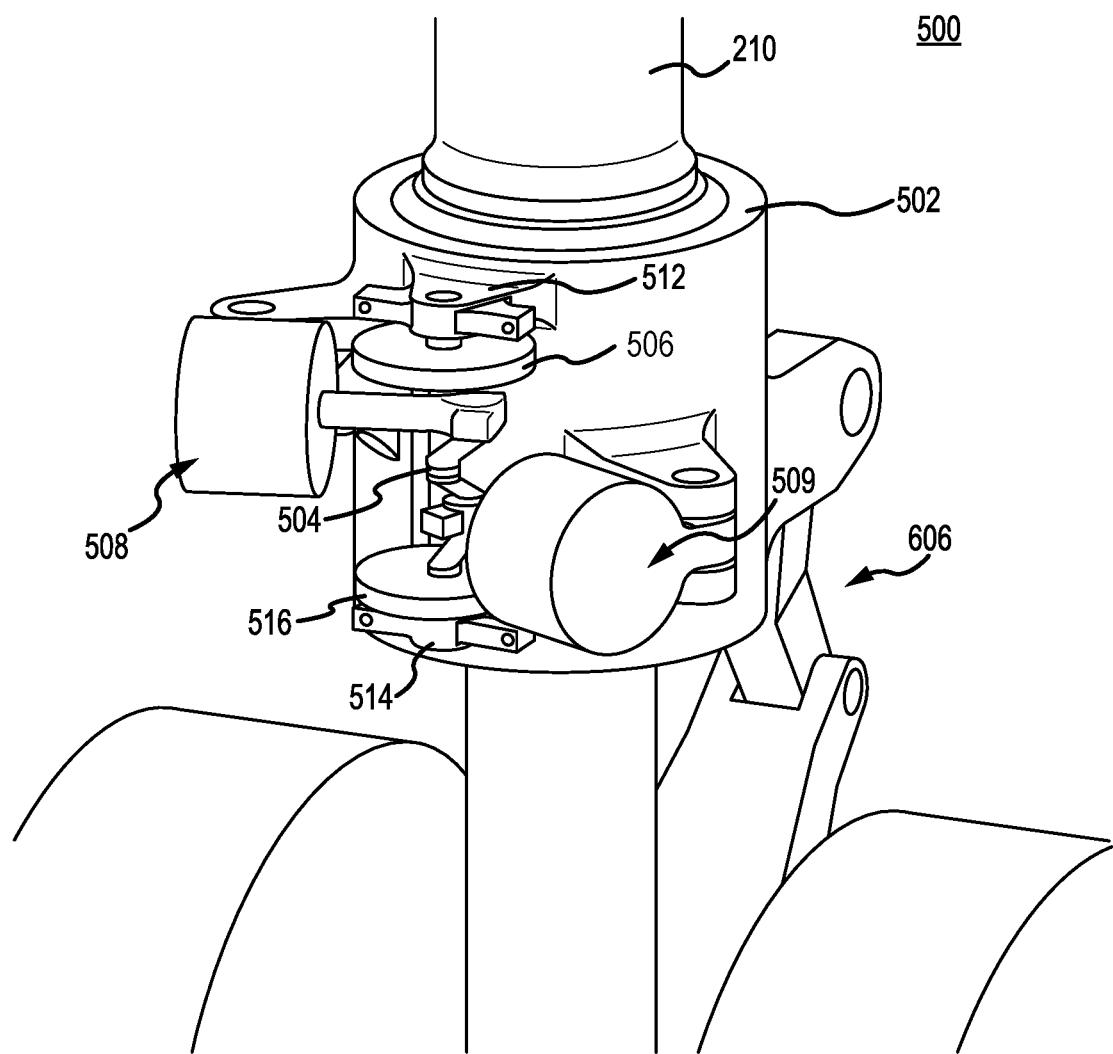
FIG. 5 illustrates a steering system, in accordance with various embodiments.

With reference to FIG. 5 a steering system 500 in accordance with various embodiments. Steering system 500 comprises various features, materials, geometries, construction, manufacturing techniques, and/or internal components similar to steering system 200. Steering system 500 differs in that it includes a second linear actuator arranged with the first linear actuator in a V configuration. It will be appreciated that any number of linear actuators may be arranged in this configuration to provide a desired motive power for the steering system 500. The steering system 500 includes a steering collar 502, a crankshaft 504, a first drive gear 506, a second drive gear 516 a first linear actuator 508, and a second linear actuator 509. In various embodiments, a first bearing mount 512 and a second bearing mount 514 extend orthogonally from the outermost diameter of the steering collar 502. The crankshaft 504 may be coupled between the bearing mounts (512, 514) and parallel to the axis of the strut cylinder 210. In this regard, the crankshaft 504 may be free to rotate. Each of the first drive gear 506 and second drive gear 516 may be fixed to the crankshaft 504.

Figure 6:
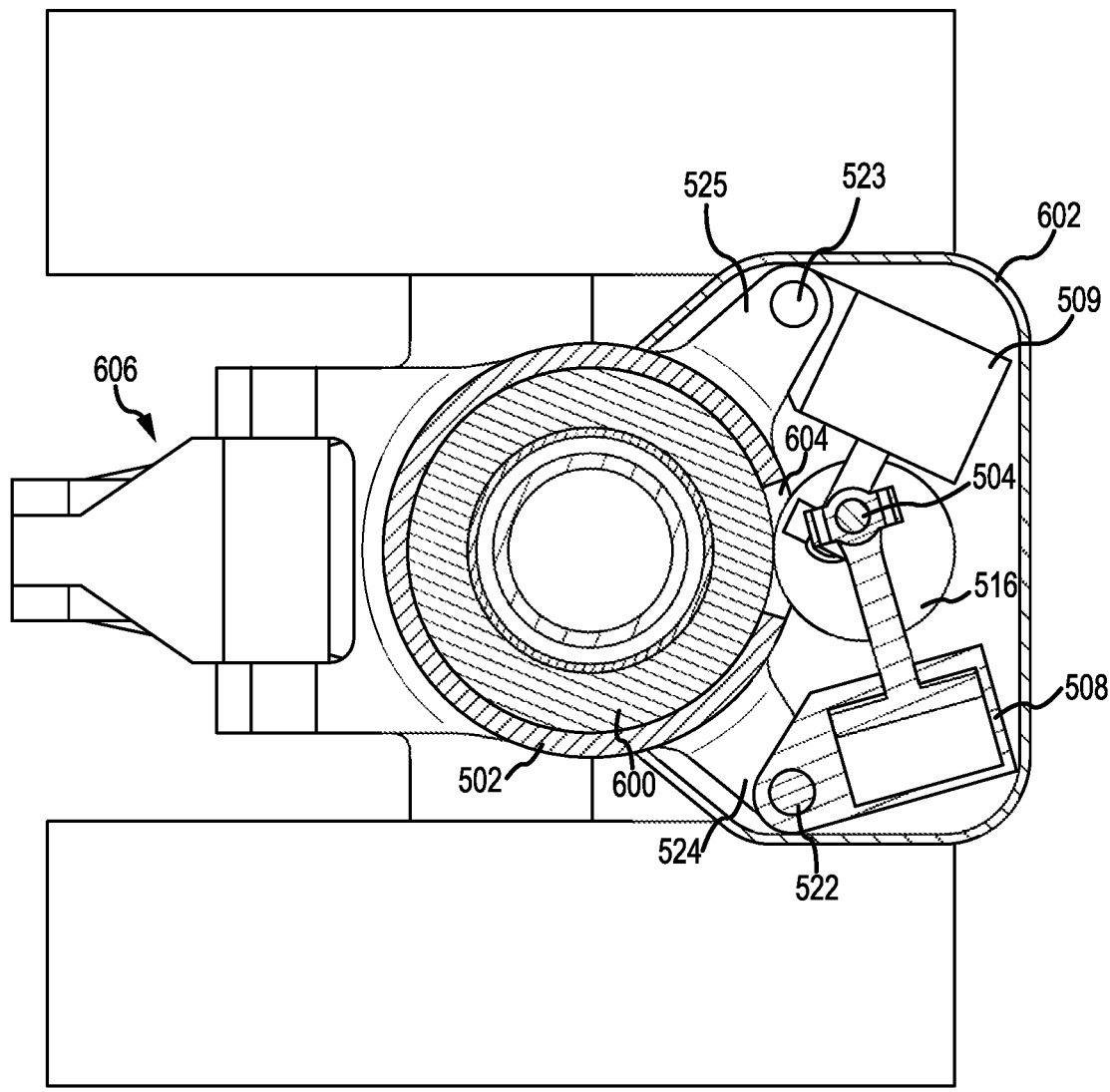
FIG. 6 illustrates a cross-section of a steering system, in accordance with various embodiments.
Figure 7:
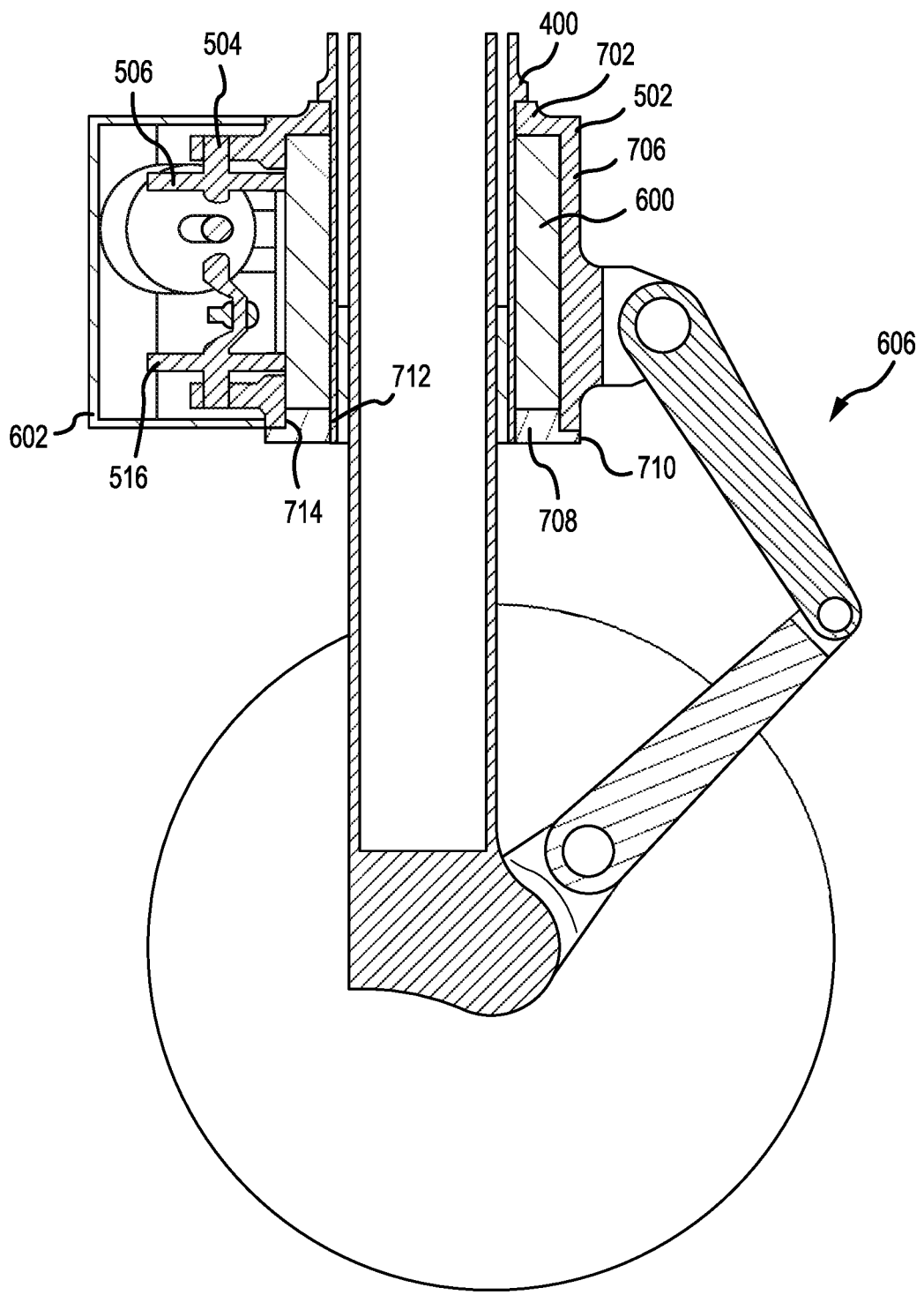
FIG. 7 illustrates a cross-section of a steering system, in accordance with various embodiments.
Figure 8:
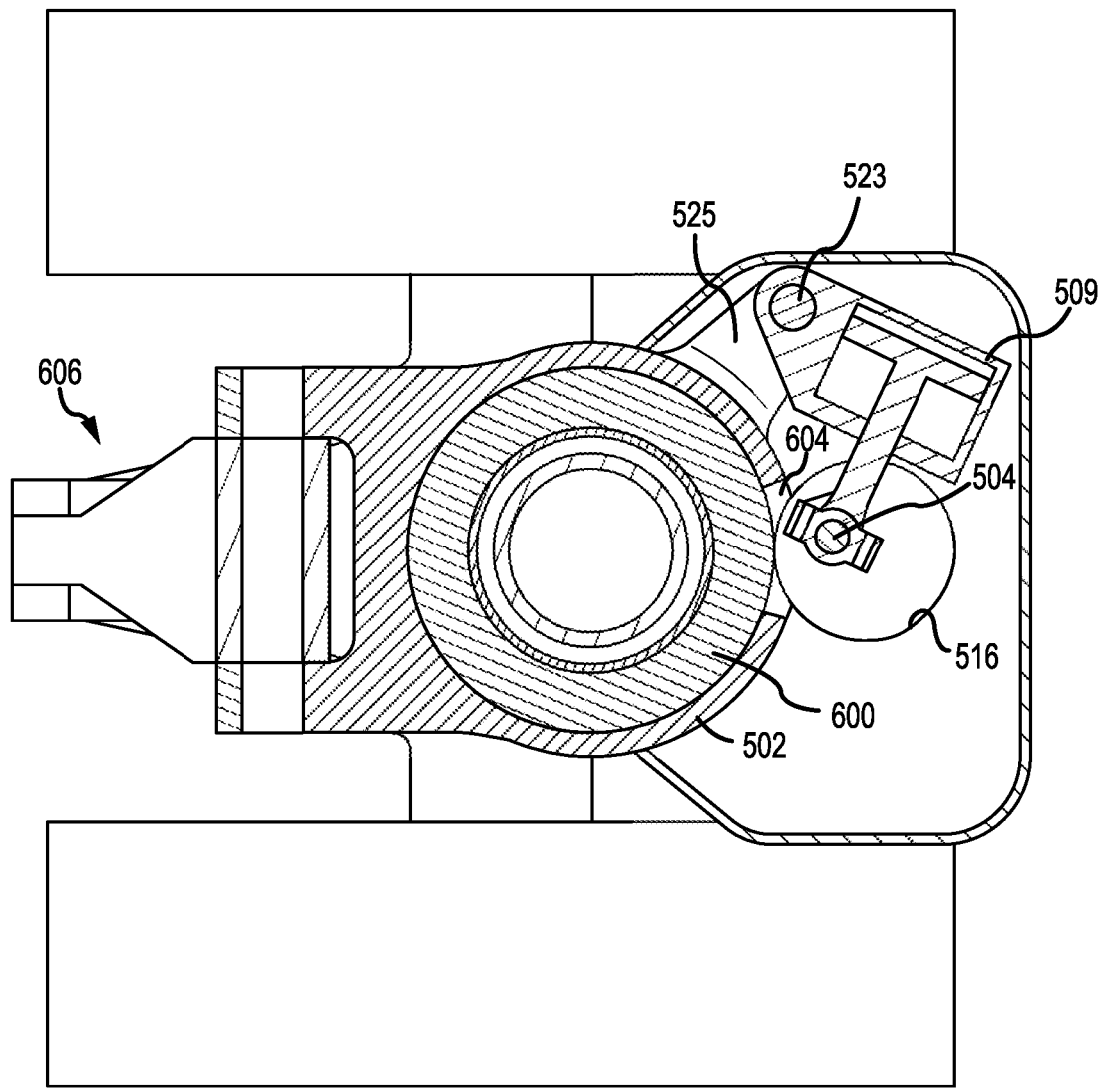
FIG. 8 illustrates a cross-section of a steering system, in accordance with various embodiments.

In various embodiments and with additional reference to FIGS. 6 through 8, steering system 500 is shown in cross section through a plane orthogonal to the strut cylinder 210 through the first linear actuator 508 (FIG. 6), in axial cross section in a plane through the axis of the strut cylinder 210 (FIG. 7), and in cross section through a plane orthogonal to the strut cylinder 210 through the second linear actuator 509 (FIG. 8). In various embodiments, the collar 502 may be coupled to a torque link 606. Linear actuators (508, 509) are illustrated as a piston-type linear actuator but it will be appreciated that any type (e.g., hydraulic, pneumatic, electrical, etc.) of linear actuator may be employed. In various embodiments, each linear actuator (508, 509) is coupled to the crankshaft 504 at a corresponding first end. Each linear actuator (508, 509) comprises a corresponding trunnion (522, 523) at a second end distal of the first end. Collar 502 includes a first trunnion block 524 and a second trunnion block 525. The trunnion blocks (524, 525) extend radially from the sidewall 706 of the collar 502. The trunnion blocks (524, 525) are located circumferentially about the collar 502 proximate the portal 604 and such that the portal 604 is disposed relatively between the first trunnion block 524 and the second trunnion block 525. In this regard, the linear actuators (508, 509) are aligned relatively in a V configuration with each arm of the V comprising a linear actuator extending radially from the axis of the strut cylinder 210 with the corresponding second ends of the linear actuators (508, 509) distal of each other.

In response to a command signal, the linear actuators (508, 509) may cause rotation of the crankshaft 504 and thereby the drive gears (506, 516). Each of the drive gears (506, 516) may be configured to mesh with a corresponding sun gear 600 fixed to strut cylinder 210. In various embodiments, the drive gears (506, 516) couple to the sun gear 600 via a portal 604 through the sidewall 706 of the collar 202. Thereby, the collar 502 may be driven to rotate about the axis of the strut cylinder 210. In various embodiments, the sun gear 600 may be fixed to the strut cylinder 210 by splines or dowels. In various embodiments, the linear actuators (508, 509) and the drive gears (506, 516) may be enclosed by a housing 602 or other covering. In this regard, the components of the steering system 500 may be protected from harsh environments.

In various embodiments the collar 502 is retained from sliding axially upward along the strut cylinder 210 by a shoulder 400. Shoulder 400 may protrude radially from the strut cylinder 210. In various embodiments, the collar 502 includes a reinforced portion 702 which extends from the upper surface of the collar 502. The reinforced portion 702 abuts the shoulder 400 and a contact generated therebetween may tend to retain the collar and thereby inhibit the collar from translating axially upward. In various embodiments, the collar 502 includes a retention feature 708. The retention feature may be located opposite the upper surface of the collar 502 and configured to retain the sun gear 600 within the collar 502. In various embodiments, the retention feature 708 may couple the collar 502 to the strut cylinder 210. For example, the retention feature may include a flange 710 and thereby tend to inhibit the collar from sliding axially downward along the strut cylinder 210. In various embodiments, the retention feature may be a nut or a segmented nut and may comprise inner threading 712 with the strut cylinder 210 and/or outer threading 714 with the collar 502.

Figure 9:
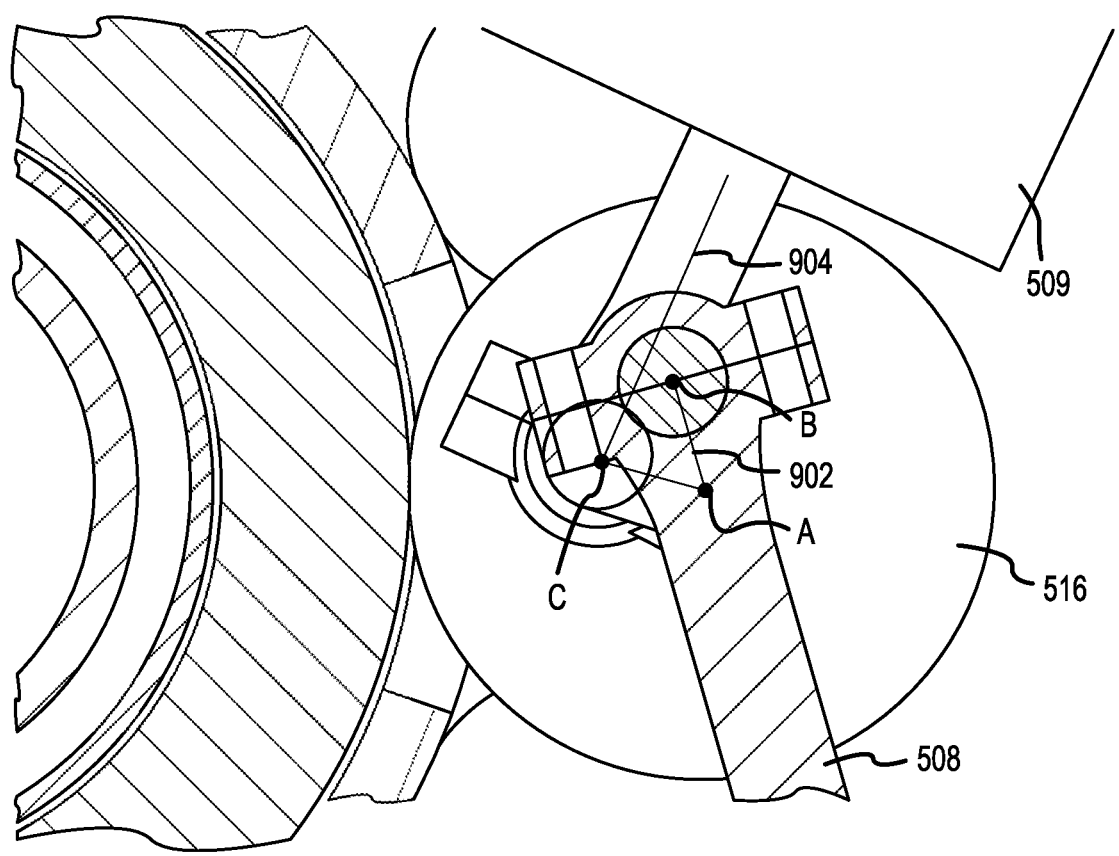
FIG. 9 illustrates a crankshaft geometry of a steering system, in accordance with various embodiments.

With additional reference to FIG. 9, geometries of the crankshaft 504 and crankpin couplings to the linear actuators (508, 509) are illustrated. The first linear actuator 508 is at full stroke with its line of action 902 passing through the crankshaft 504 axis of rotation A. In this configuration, the first linear actuator 508 delivers no torque to the crankshaft 504. The second linear actuator 509 is configured to have a line of action 904 which is approximately 82° (where approximately in this case means±1°) from the axis A. The angle between the crank pin axes (B, C) of the linear actuators (508, 509) relative to the axis A is approximately 57° (where approximately in this case means±1°). It will be appreciated that the line of action from the second linear actuator 509 should ideally be 90° while the line of action from the first linear actuator 508 is 0°. In this regard, the second linear actor 509 may provide torque to the crankshaft 504 and thereby enable steering control when the first linear actuator 508 is inhibited from providing torque and vice versa.

Figure 10:
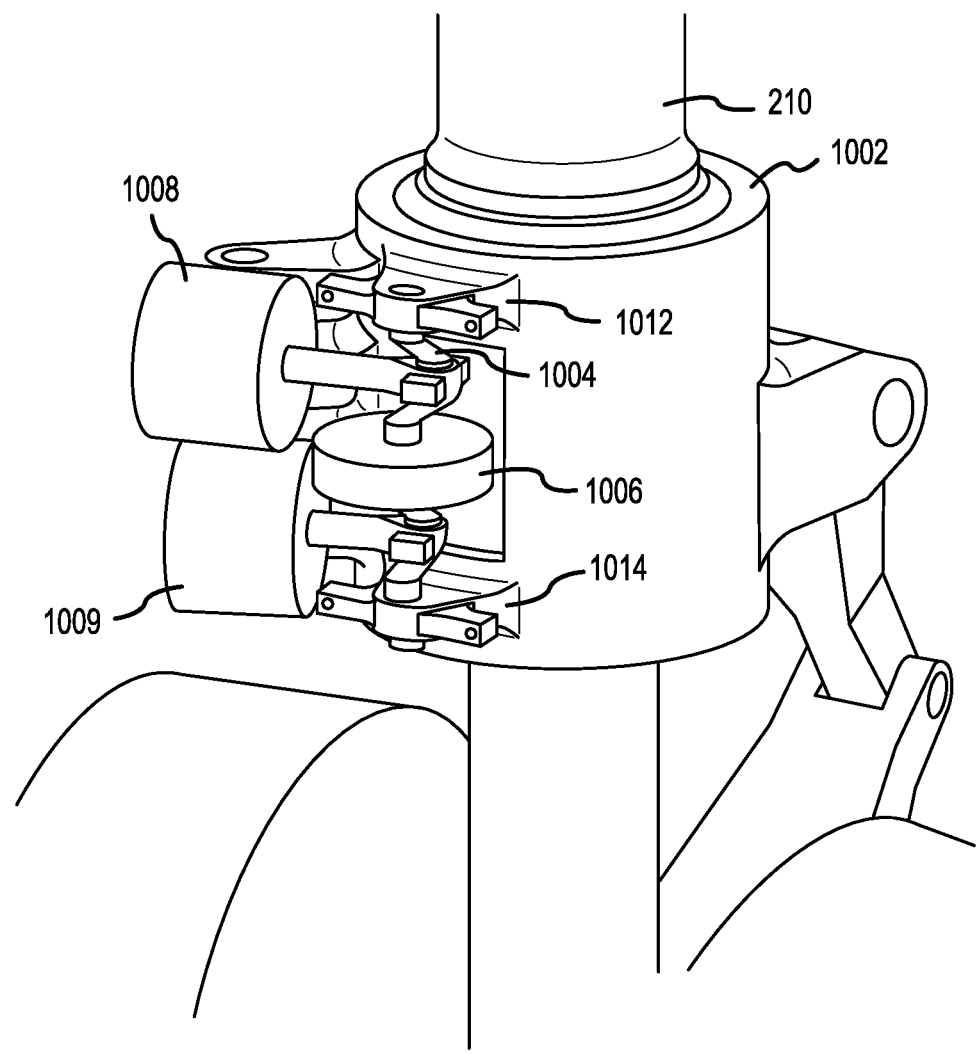
FIG. 10 illustrates a steering system, in accordance with various embodiments.

With reference to FIG. 10 a steering system 1000 in accordance with various embodiments. Steering system 1000 comprises various features, materials, geometries, construction, manufacturing techniques, and/or internal components similar to steering system 500. Steering system 1000 differs in that it includes a second linear actuator arranged with the first linear actuator in an in-line configuration. It will be appreciated that any number of linear actuators may be arranged in this configuration to provide a desired motive power for the steering system 1000. The steering system 1000 includes a steering collar 1002, a crankshaft 1004, a first drive gear 1006, a first linear actuator 1008, and a second linear actuator 1009. In various embodiments, a first bearing mount 1012 and a second bearing mount 1014 extend orthogonally from the outermost diameter of the steering collar 1002. The crankshaft 1004 may be coupled between the bearing mounts (1012, 1014) and parallel to the axis of the strut cylinder 210. In this regard, the crankshaft 1004 may be free to rotate. The first drive gear 1006 may be fixed to the crankshaft 1004.

Figure 11:
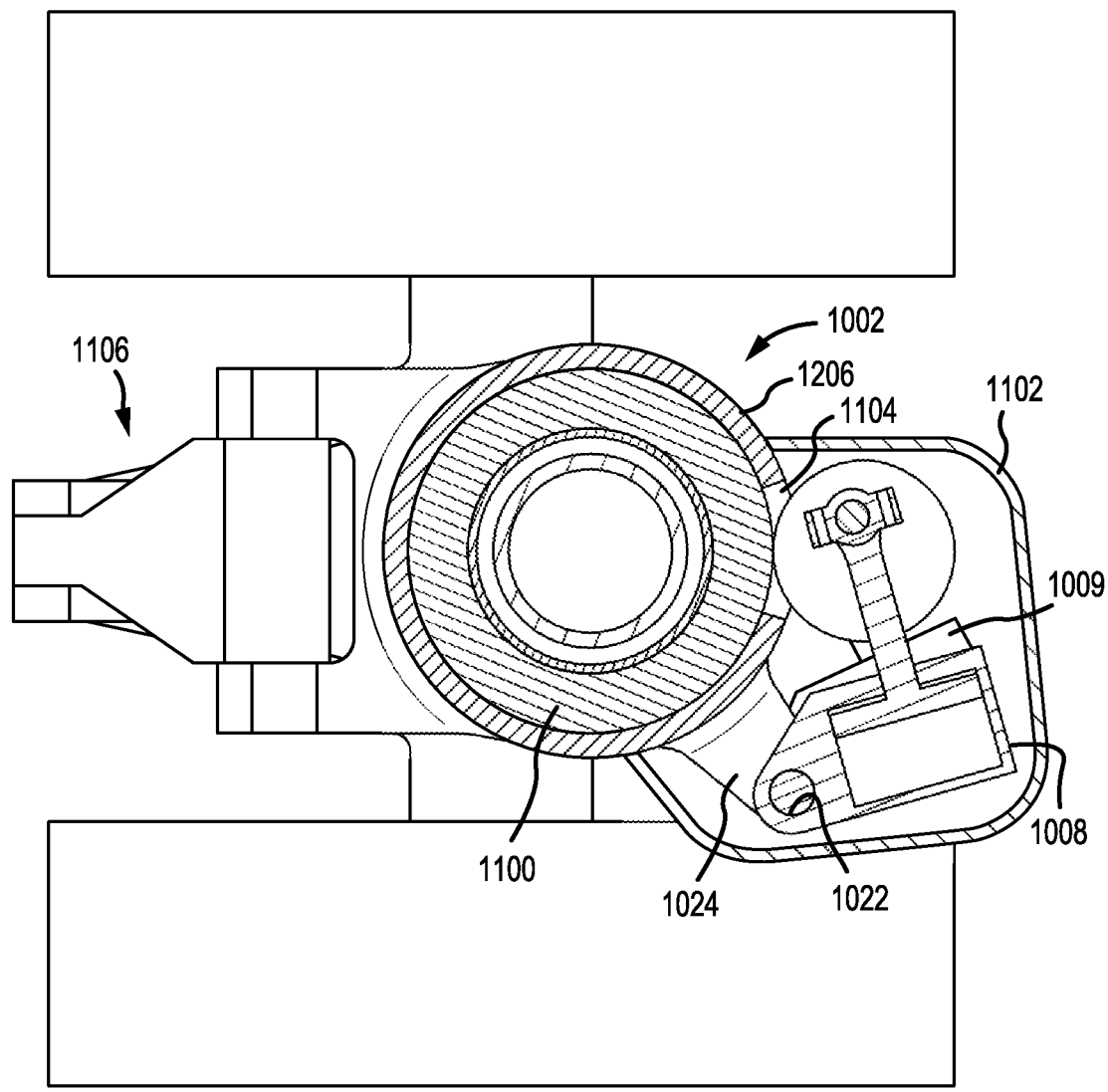
FIG. 11 illustrates a cross-section of a steering system, in accordance with various embodiments.
Figure 12:
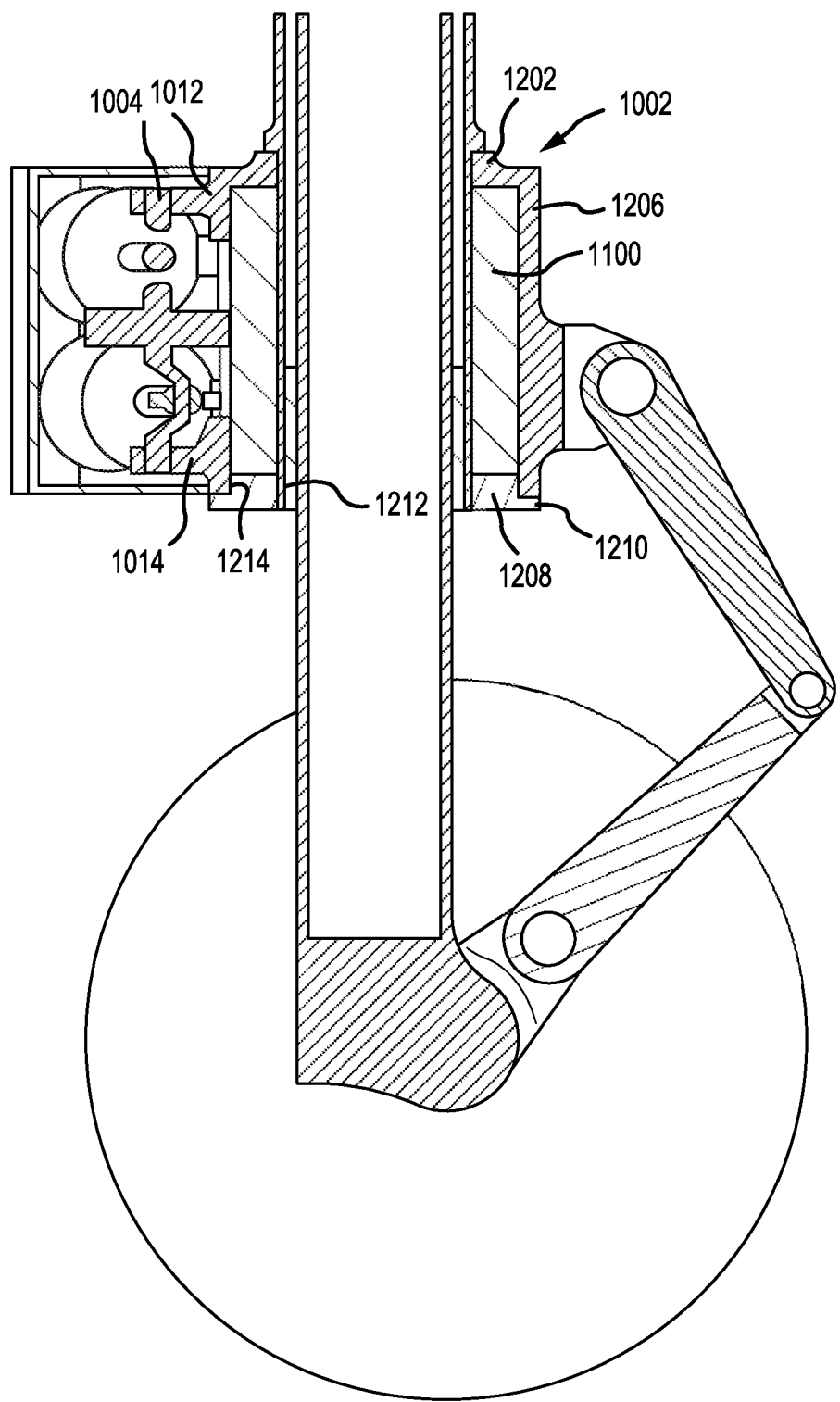
FIG. 12 illustrates a cross-section of a steering system, in accordance with various embodiments.
Figure 13:
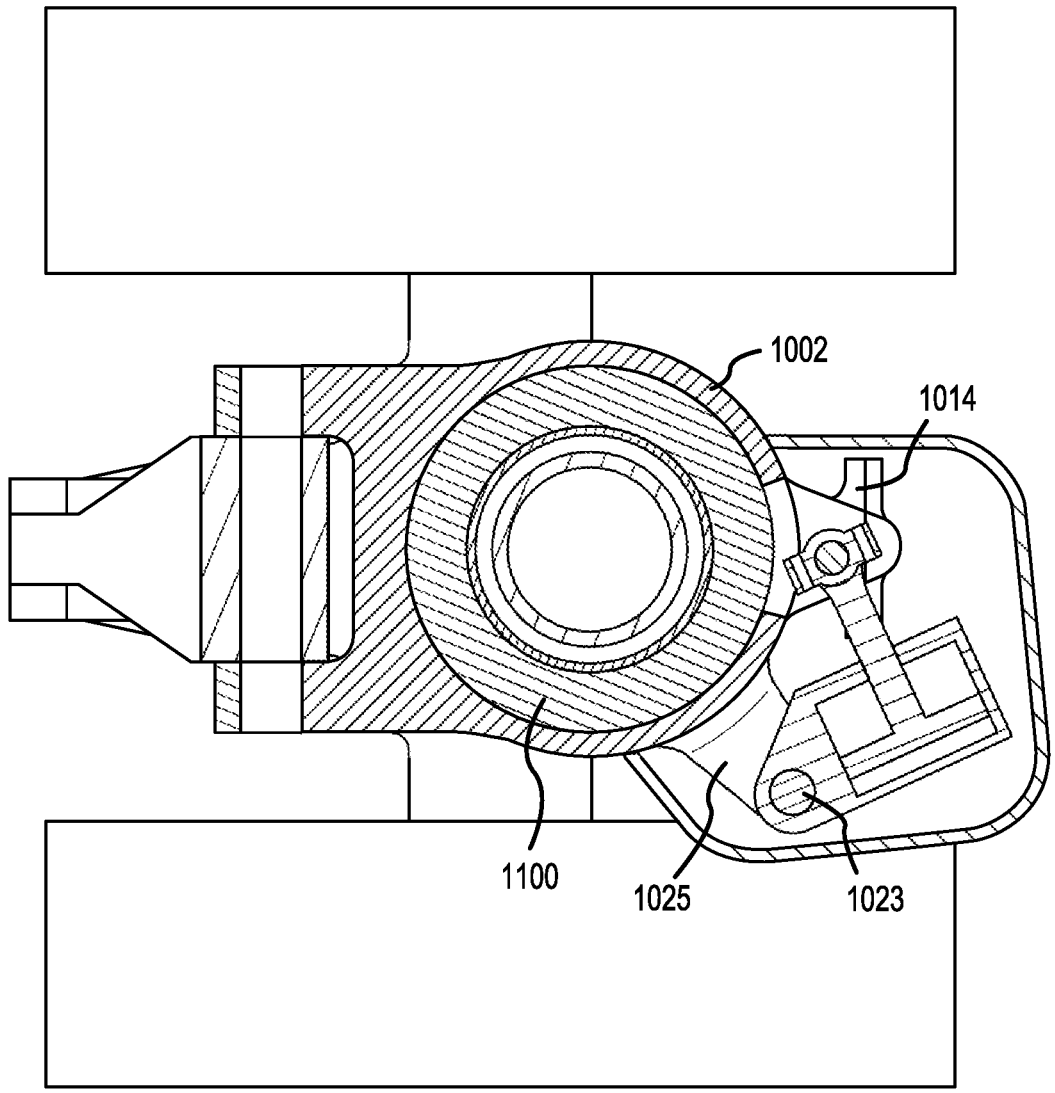
FIG. 13 illustrates a cross-section of a steering system, in accordance with various embodiments.

In various embodiments and with additional reference to FIGS. 11 through 13, steering system 1000 is shown in cross section through a plane orthogonal to the strut cylinder 210 through the first linear actuator 1008 (FIG. 11), in axial cross section in a plane through the axis of the strut cylinder 210 (FIG. 12), and in cross section through a plane orthogonal to the strut cylinder 210 through the second linear actuator 1009 (FIG. 13). In various embodiments, the steering collar 1002 may be coupled to a torque link 1106. Linear actuators (1008, 1009) are illustrated as a piston-type linear actuator but it will be appreciated that any type (e.g., hydraulic, pneumatic, electrical, etc.) of linear actuator may be employed. In various embodiments, each linear actuator (1008, 1009) is coupled to the crankshaft 1004 at a corresponding first end. Each linear actuator (1008, 1009) comprises a corresponding trunnion (1022, 1023) at a second end distal of the first end. Steering collar 1002 includes a first trunnion block 1024 and a second trunnion block 1025. The trunnion blocks (1024, 1025) extend radially from the sidewall 1206 of the steering collar 1002. The trunnion blocks (1024, 1025) are located circumferentially about the steering collar 1002 proximate the portal 1104 and such that the portal 1104 is disposed relatively adjacent the same side of each of the first trunnion block 1024 and the second trunnion block 1025. In this regard, the linear actuators (1008, 1009) are aligned relatively in a row along the axis of the strut cylinder 210 with the corresponding second ends of the linear actuators (1008, 1009) proximate each other.

In response to a command signal, the linear actuators (1008, 1009) may cause rotation of the crankshaft 1004 and thereby the drive gear 1006. The drive gear 1006 may be configured to mesh with a corresponding sun gear 1100 fixed to strut cylinder 210. In various embodiments, the drive gear 1006 couples to the sun gear 1100 via a portal 1104 through the sidewall 1206 of the steering collar 1002. Thereby, the steering collar 1002 may be driven to rotate about the axis of the strut cylinder 210. In various embodiments, the sun gear 1100 may be fixed to the strut cylinder 210 by splines or dowels. In various embodiments, the linear actuators (1008, 1009) and the drive gear 1006 may be enclosed by a housing 1102 or other covering. In this regard, the components of the steering system 1000 may be protected from harsh environments.

In various embodiments the steering collar 1002 is retained from sliding axially upward along the strut cylinder 210 by a shoulder 400 which protrudes radially from the strut cylinder 210. In various embodiments, the steering collar 1002 includes a reinforced portion 1202 which extends from the upper surface of the steering collar 1002 and abuts the shoulder 400. In various embodiments, the steering collar 1002 includes a retention feature 1208 opposite. The retention feature may be located opposite the upper surface of the steering collar 1002 and configured to retain the sun gear 1100 within the steering collar 1002. In various embodiments, the retention feature 1208 may couple the collar 502 to the strut cylinder 210. For example, the retention feature may include a flange 1210 and thereby tend to inhibit the collar from sliding axially downward along the strut cylinder 210. In various embodiments, the retention feature may be a nut or a segmented nut and may comprise inner threading 1212 with the strut cylinder 210 and/or outer threading 1214 with the steering collar 1002.

Figure 14:
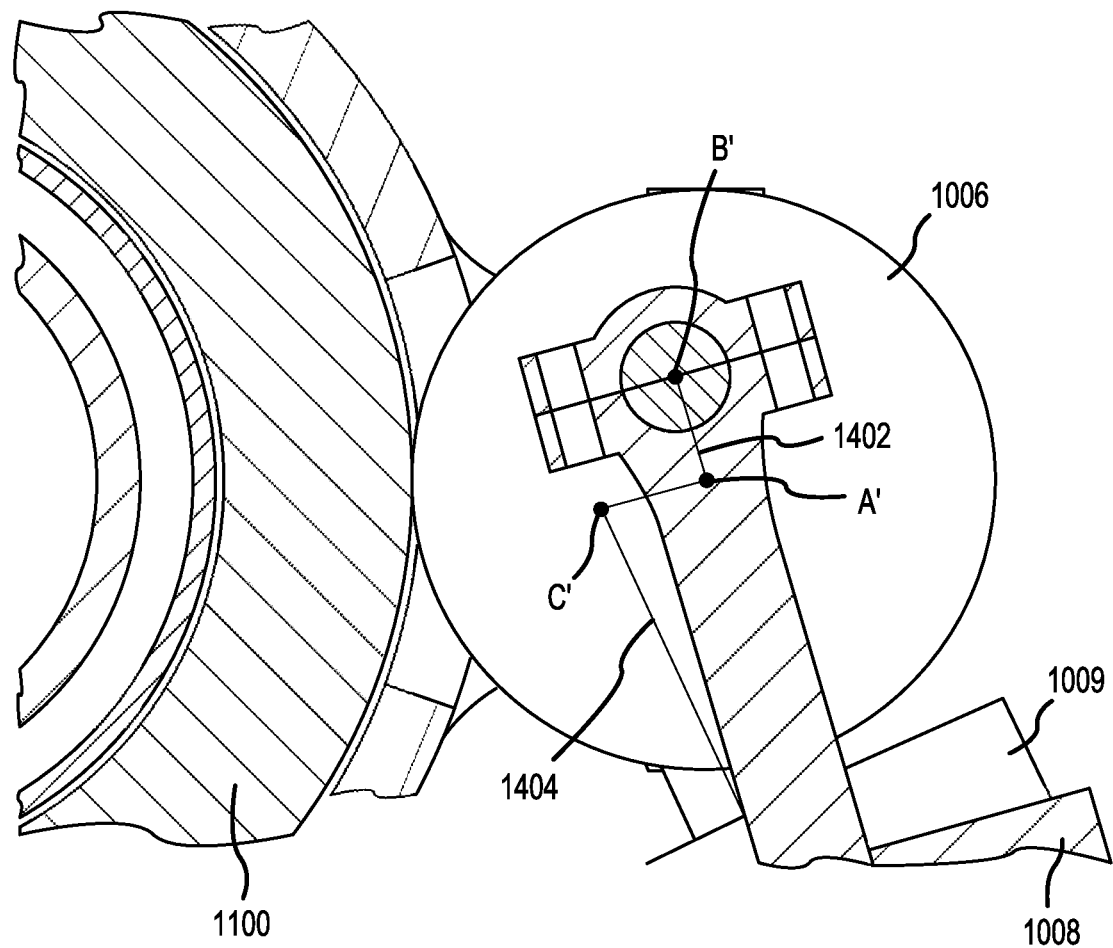
FIG. 14 illustrates a crankshaft geometry of a steering system, in accordance with various embodiments.

With additional reference to FIG. 14, geometries of the crankshaft 1004 and crankpin couplings to the linear actuators (1008, 1009) are illustrated. The first linear actuator 1008 is at full stroke with its line of action 1402 passing through the crankshaft 1004 axis of rotation A'. In this configuration, the first linear actuator 1008 delivers no torque to the crankshaft 1004. The second linear actuator 1009 is configured to have a line of action 1404 which is approximately 80° (where approximately in this case means±1°) from the axis A'. The angle between the crank pin axes (B', C') of the linear actuators (1008, 1009) relative to the axis A' is approximately 90° (where approximately in this case means±1°). It will be appreciated that the line of action from the second linear actuator 1009 should ideally be 90° while the line of action from the first linear actuator 1008 is 0°. In this regard, the second linear actor 1009 may provide torque to the crankshaft 1004 and thereby enable steering control when the first linear actuator 1008 is inhibited from providing torque and vice versa.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A steering apparatus, comprising:
   a steering collar including a sidewall and a portal through the sidewall;
   a first linear actuator;
   a first drive gear;
   a crankshaft; and
   a sun gear,
   wherein the sun gear is disposed within the steering collar,
   wherein the first drive gear is fixed to the crankshaft and coupled to the sun gear via the portal such that the steering collar rotates about the sun gear in response to rotation of the crankshaft,
   wherein the first linear actuator is coupled between the crankshaft and the steering collar.

2. The steering apparatus of claim 1, further comprising a second drive gear.

3. The steering apparatus of claim 1, further comprising a second linear actuator coupled between the crankshaft and the steering collar.

4. The steering apparatus of claim 3, wherein the second linear actuator is arranged with the first linear actuator in a V configuration.

5. The steering apparatus of claim 3, wherein the second linear actuator is arranged with the first linear actuator in an in-line configuration.

6. A steering system for an aircraft comprising:
a strut cylinder;
a strut piston; and
a steering apparatus comprising:
a steering collar coupled to the strut cylinder, the steering collar including a sidewall and a portal through the sidewall;
a first linear actuator;
a first drive gear;
a crankshaft; and
a sun gear fixed to the strut cylinder,
wherein the sun gear is disposed within the steering collar,
wherein the first drive gear is fixed to the crankshaft and coupled to the sun gear via the portal such that the steering collar rotates about the sun gear in response to rotation of the crankshaft,
wherein the first linear actuator is coupled between the crankshaft and the steering collar.

7. The steering system of claim 6, further comprising a second drive gear.

8. The steering system of claim 6, further comprising a second linear actuator coupled between the crankshaft and the steering collar.

9. The steering system of claim 8 wherein the second linear actuator is arranged with the first linear actuator in a V configuration.

10. The steering system of claim 8, wherein the second linear actuator is arranged with the first linear actuator in an in-line configuration.

11. The steering system of claim 6, wherein the steering collar further comprises a retention feature opposite an upper surface of the steering collar and configured to retain the sun gear within the steering collar.

12. The steering system of claim 11, wherein the steering collar includes a reinforced portion at the upper surface, wherein the reinforced portion abuts a shoulder of the strut cylinder generating a contact therebetween which inhibits the steering collar from translating axially upward along the strut cylinder.

13. An aircraft comprising:
a plurality of landing gear; and
a steering system coupled to at least one of the landing gear, the steering system comprising:
a strut cylinder;
a strut piston; and
a steering apparatus comprising:
a steering collar coupled to the strut cylinder, the steering collar including a sidewall and a portal through the sidewall;
a torque link coupled to the steering collar;
a first linear actuator;
a first drive gear;
a crankshaft; and
a sun gear fixed to the strut cylinder,
wherein the sun gear is disposed within the steering collar,
wherein the first drive gear is fixed to the crankshaft and coupled to the sun gear via the portal such that the steering collar rotates about the sun gear in response to rotation of the crankshaft,
wherein the first linear actuator is coupled between the crankshaft and the steering collar.

14. The aircraft of claim 13, further comprising a second drive gear.

15. The aircraft of claim 13, further comprising a second linear actuator coupled between the crankshaft and the steering collar.

16. The aircraft of claim 15, wherein the second linear actuator is arranged with the first linear actuator in a V configuration.

17. The aircraft of claim 15, wherein the second linear actuator is arranged with the first linear actuator in an in-line configuration.

* * * * *